United States Patent [19]

Ernst

[11] Patent Number: 5,027,375
[45] Date of Patent: Jun. 25, 1991

[54] PROCESS FOR THE RESYNCHRONIZATION OF AN EXCHANGE IN A TELECOMMUNICATION NETWORK

[75] Inventor: Wolfram Ernst, Munich, Fed. Rep. of Germany

[73] Assignees: Siemens Aktiegesellschaft, Berlin and Munich, Fed. Rep. of Germany; Siemens Aktiengesellschaft, Berlin and Munich, Fed. Rep. of Germany

[21] Appl. No.: 409,218

[22] Filed: Sep. 19, 1989

[30] Foreign Application Priority Data

Sep. 22, 1988 [DE] Fed. Rep. of Germany ....... 3832241
Sep. 22, 1988 [DE] Fed. Rep. of Germany ....... 3833940
Sep. 22, 1988 [DE] Fed. Rep. of Germany ....... 3833940

[51] Int. Cl.$^5$ .............................................. H03L 7/00
[52] U.S. Cl. ..................................... 375/107; 370/103
[58] Field of Search ................ 375/107, 108; 370/103, 370/105.4, 105.5; 371/5.4, 47.1

[56] References Cited

U.S. PATENT DOCUMENTS

| | | | |
|---|---|---|---|
| 3,813,526 | 5/1974 | Watson et al. | 370/103 |
| 3,992,580 | 11/1976 | Bittel et al. | 370/103 |
| 4,063,244 | 12/1977 | Van de Kop | 375/107 |
| 4,412,342 | 10/1983 | Khan et al. | 375/108 |
| 4,542,503 | 9/1985 | Fladerer et al. | 370/105.4 |
| 4,677,614 | 6/1987 | Circo | 375/107 |
| 4,837,850 | 6/1989 | Maisel et al. | 375/107 |
| 4,849,993 | 7/1989 | Johnson et al. | 375/108 |

Primary Examiner—Benedict V. Safourek
Assistant Examiner—Young Tse
Attorney, Agent, or Firm—Adel A. Ahmed; Adel A. Ahmed

[57] ABSTRACT

A network is synchronized by a hierarchical adjustment and the individual exchanges are equipped with frequency monitors for the reference frequencies that synchronize them, which, when activated, switch the center to another reference frequency or change it to the hold-over mode. When one of these exchanges is resynchronized, the rate-of-change of its reference frequency output signal of its central clock pulse generator is limited so that no frequency alarms are triggered in downstream exchanges synchronized by this exchange.

1 Claim, 1 Drawing Sheet

PROCESS FOR THE RESYNCHRONIZATION OF AN EXCHANGE IN A TELECOMMUNICATION NETWORK

FIELD OF THE INVENTION

The present invention relates to a process for the resynchronization of an exchange in a telecommunication network.

BACKGROUND OF THE INVENTION

In synchronous telecommunication networks of the above-mentioned kind, the synchronization of the individual exchanges is usually done according to the hierarchical master-slave principle through digital signal connections, as shown, for example, in FIG. 1. In this case, an exchange (e.g., V2) can be both a master exchange (transmitter of a reference frequency signal) with respect to one or more exchanges of the same rank (e.g., V3) or of a rank subordinated to it by a hierarchical level HL (e.g., V4), and a slave exchange (receiver of a reference frequency signal) with respect to one or more exchanges of the same rank or of a rank that is superior by a hierarchical level HL (e.g., V1).

If in an exchange (e.g., V1) the highly accurate pulse signal (exchange pulse signal) generated by its highly stable central clock pulse generator should fail the clock generators in this exchanges downstream of the central clock pulse generator will no longer be supplied with this exchange pulse signal, whereupon, due to their comparatively low internal stability, the accuracy of their frequency will drop abruptly for practical purposes.

Since the reference frequency signals ($f_{R1}$, $f_{R2}$) are generated by these group clock pulse generators for exchanges (e.g., V2) of the same rank or of a rank subordinated by a hierarchical level, the accuracy of the reference frequency signal ($f_{R1}$) received by such an exchange will likewise drop abruptly. In order to be able to detect this loss of accuracy, the central clock pulse generators of exchanges possess frequency monitors. These frequency monitors monitor the deviation between the frequency of the received reference frequency input signal (e.g. $f_{R1}$) and the frequency of the output signal of one of the two central clock pulse generators present in an exchange (e.g. V2) and, when a specific frequency deviation—hereinafter simply called a threshold—is exceeded, trigger a frequency alarm.

Since the frequency deviation cannot be measured directly, the exceeding of the frequency deviation threshold is detected by measuring the drift of the corresponding phase deviation between the received reference frequency input signal and the generated reference frequency output signal within a certain measurement period (measurement cycle).

If the reference frequency input signal and the reference frequency output signal are independent of one another, then a drift in the reference frequency will sooner or later produce, quickly or slowly, a certain frequency deviation and thus a frequency alarm. However, if the reference frequency output signal is synchronized to the reference frequency input signal, then it will follow the reference frequency input signal in accordance with the time constants of the phase control loop responsible for the synchronization in the central clock pulse generator (dependent output frequency).

Whether a frequency alarm occurs in the case of a dependent output frequency depends on how large the frequency drift and the time constants of the control loop are. If the phase control loop is in, for instance, an operating mode in which its time constants are very large, the frequency of the reference frequency output signal cannot follow the frequency of the reference frequency input signal fast enough when there is a rapid frequency drift. The frequency deviation between the frequencies of the reference frequency input and output signals will finally be so large that a frequency alarm will be triggered.

On the other hand, when the frequency drift is sufficiently slow, the frequency of the reference frequency output signal will follow the frequency of the reference frequency input signal, so that the frequency deviation between the two never reaches the threshold for the frequency alarm.

We shall now refer again, as an example, to the exchange V2 and assume that, due to a rapid frequency drift in the frequency of the reference frequency input signal $f_{R1}$ at that moment, a frequency alarm is triggered.

According to Telcom Report 1986, Vol. 4, pages 263 through 269, a check is then made to determine whether another unaffected reference frequency input signal, namely $f_{R0}$, is present. If this is the case, the system switches to this reference frequency input signal.

If no other reference frequency input signal is present, the control loop of the central clock pulse generator of the exchange V2 switches to the hold-over mode, in which its voltage-controlled oscillator (VCO) is kept at the last correct setting.

In the hold-over mode, the accuracy of the highly stable central clock pulse generator of the exchange V2 drops—through aging, for example, of the highly stable voltage-controlled oscillator—only very slowly, so that this drop cannot be detected by the frequency monitors of the downstream slave exchanges (see, e.g., V4, V5 and V6) according to the above explanation, if the reference frequency output signal of those downstream slave exchanges is dependent on the reference frequency output signal from exchange V2 (i.e. there are no frequency alarms in the downstream exchanges).

Therefore, the phase control loops of the central clock pulse generators of these slave exchanges remain in the synchronous mode, in which the phase control loops synchronize with large time constants to the reference frequency input signals of the moment. The result is that the accuracy of the network N formed by these slave exchanges drop synchronously with the frequency of the reference frequency output signal $f_{R2}$ of the exchange V2.

If the master exchange V2 remains sufficiently long in the hold-over mode, the frequency deviation of the network N from the original reference frequency $f_{R2}$ of the master exchange V2 when it switched to the hold-over mode will reach or exceed the threshold value for the frequency alarm at a certain point in time, without triggering a frequency alarm at an exchange of the network N. If, at a later time, the master exchange V2 is resynchronized by an again intact reference frequency e.g. $f_{R1}$, then exchange V2 enters a start-up mode, in which the time constants of the phase control loop are as small as possible, in order to bring the frequency of the reference frequency output signal $f_{R2}$ as quickly as possible to the frequency of the reference frequency input signal $f_{R1}$.

Because of the high rate of change of the frequency of the reference frequency output signal $f_{R2}$ and the large time constants of the phase control loops of the slave exchanges in the network N, frequency alarms will occur in these slave exchanges causing those exchanges to switch over to the hold-over mode. Thus, the desired resynchronization of the network N through resynchronization of the master exchange V2 will not take place.

The reason why exchange V2 remains so long in the hold-over mode may be attributed, on the one hand, to the disappearance of all its reference frequencies $f_{R0}$, $f_{R1}$ for a long time, or, on the other, to the fact that it is being operated in the master mode, i.e., as an independent frequency standard for the network N, but, has not, in this case, been attended to—that is, resynchronized—for too long a time.

SUMMARY OF THE INVENTION

The purpose of the invention is to resynchronize a network, the accuracy of whose frequency has dropped imperceptibly below the frequency alarm threshold, by resynchronizing its master exchange.

In accordance with principles of the present invention, a process for the resynchronization of an exchange in a telecommunication network, which is synchronized by an adjustment according to a hierarchical structure and whose exchanges are equipped with frequency monitors that detect a loss of accuracy in a reference frequency by which they are currently being synchronized, so that, if necessary, after a frequency alarm is triggered, they can be switched to another unaffected reference frequency, or otherwise changed to the hold-over mode, is characterized by the fact that the subsequent frequency flow of a central clock pulse generator of this switching center is limited in such a manner that frequency alarms do not occur in the exchanges of a network that is synchronized exclusively by that exchange.

DESCRIPTION OF THE PREFERRED EMBODIMENTS

An example of apparatus implementing the process in accordance with the invention using a microprocessor is explained in greater detail below, with the aid of FIG. 2.

Figure 1:
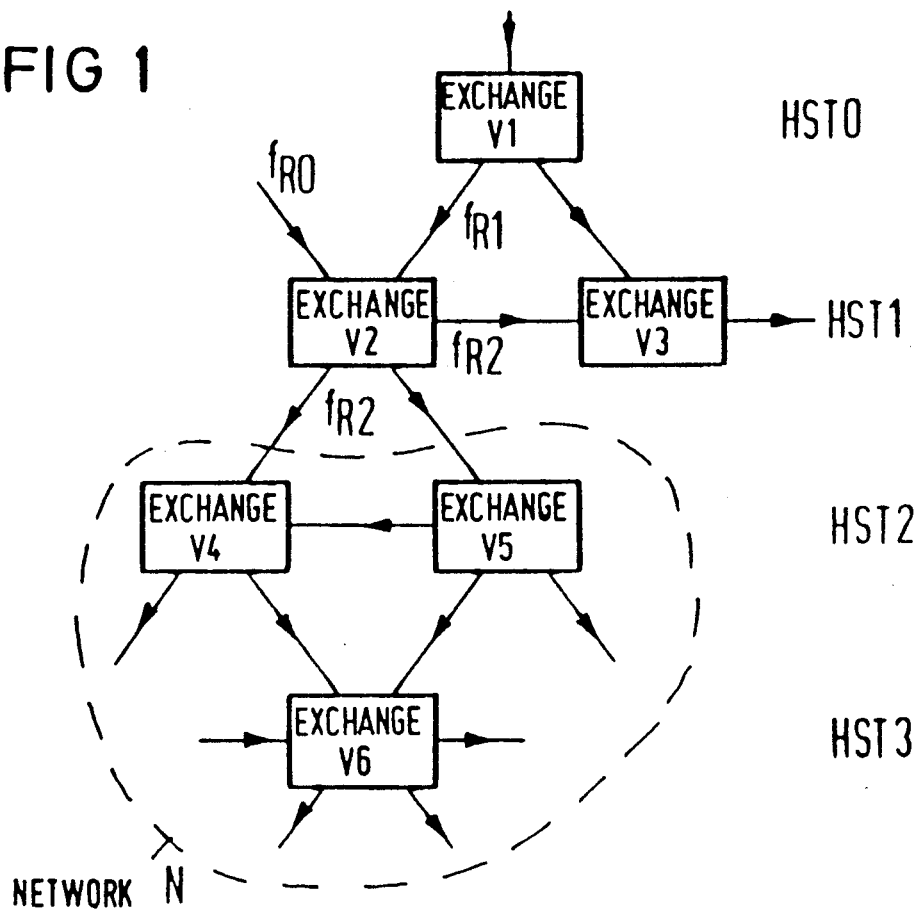
FIG. 1 shows the network structure described above for the adjusted synchronization of exchanges according to the master-slave principle.
Figure 2:
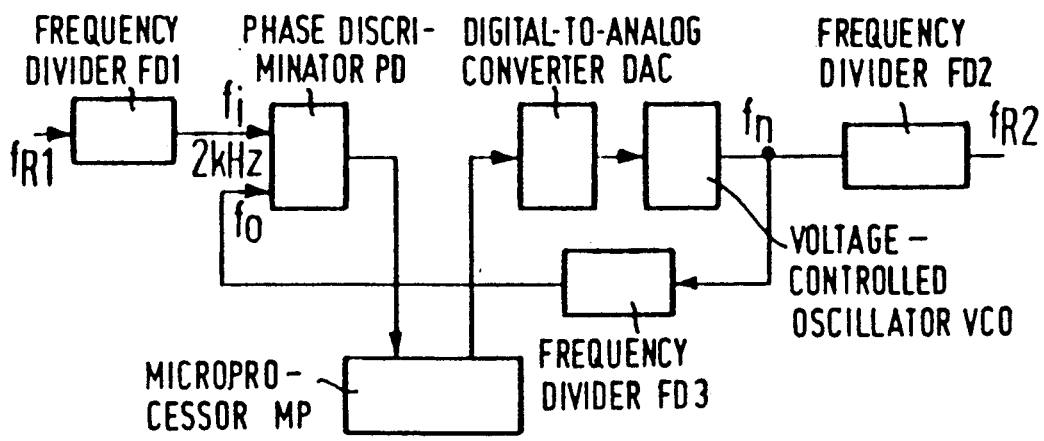
FIG. 2 shows a block circuit diagram of a microprocessor-controlled digital phase control loop in a central clock pulse generator which operates according to the present invention.

The phase-control loop in FIG. 2 is that of a central clock pulse generator of the exchange V2 (of FIG. 1), through which a standardized reference frequency output signal $f_o$ is synchronized to a standardized reference frequency input signal $f_i$. The standardization of both the reference frequency input signal $f_{R1}$ for the exchange V2 and the output frequency signal $f_n$ of a voltage-controlled oscillator (VCO) is accomplished by two frequency dividers FD1 and FD3. A microprocessor MP receives an output signal of a phase discriminator PD corresponding to the phase deviation between the standardized reference frequency input and output signals, $f_i$ and $f_o$ respectively, and computes from it the digital control value signal for the voltage-controlled oscillator VCO. The interface between the microprocessor and the voltage-controlled oscillator VCO is a digital-to-analog converter DAC. A frequency divider FD2 divides the frequency of the output signal $f_n$ of the voltage-controlled oscillator VCO down to produce the reference frequency output signal $f_{R2}$, which represents the exchange pulse signal of the exchange V2.

If the phase control loop is in the hold-over mode and the reference frequency $f_{R1}$ reappears, the phase control loop changes to the start-up mode, in which resynchronization takes place with greatly reduced time constants, in order to bring the frequency of the reference frequency output signal $f_{R2}$ as quickly as possible to the frequency of the reference frequency input signal $f_{R1}$.

The improvement resulting from this invention consists in operating the microprocessor in such a way that the frequency of the reference frequency output signal $f_{R2}$ is changed to the frequency of the reference frequency input signal $f_{R1}$ at such a rate that no frequency alarm occurs in the exchanges of the downstream network N and the exchanges in the network N remain in the synchronous mode.

The procedure by which this purpose is accomplished is described by way of numerical example, in detail below.

Frequency monitors are based on the fact that a frequency deviation results in a change over time in the phase deviation, as already explained. In order to prevent an improper adjustment of the voltage controlled oscillator VCO, it is desired to determine the failure of the central clock pulse generator of the exchange V1 as promptly as possible, i.e., within a short monitoring time. Since the failure of this central clock pulse generator causes an abrupt drop in the accuracy of the reference frequency signal $f_{R1}$, as already explained above, this can in fact be detected through a rapid change in the phase deviation, within a short monitoring time. Thus, for example, a frequency deviation $\Delta f/f$ of more than $2\times 10^{-8}$ can be detected through a change in the phase deviation of 2 $\mu$s in less than 100 seconds.

A slow drop in the accuracy of the frequency through, for instance, aging of the voltage-controlled oscillator of the exchange V2 in the hold-over mode, does not produce a phase deviation of 2 $\mu$s within the measurement cycle of 100 sec., and therefore, as described above, does not cause any frequency alarm in the exchanges synchronized by this exchange (in FIG. 1 the network N).

In order to avoid frequency alarms in the exchanges (the network N) synchronized by the exchange V2 during the resynchronization of exchange V2 when the accuracy of its frequency drops below the alarm threshold, the rate-of-change of the reference frequency output signal during the start-up mode of the central clock pulse generator of the exchange V2 must be limited as follows through an appropriate correction control of the voltage-controlled oscillator VCO. If the threshold that triggers the frequency alarm is equal, for example, to $2\times 10^{-8}$ within a measurement cycle of 100 sec., then the rate-of-change of the reference frequency output signal in the master exchange V2 in each interval of 100 sec. must be limited to not exceed $2\times 10^{-8}$. If the voltage-controlled oscillator VCO in this exchange has, e.g., a pull-in range of $z=7\times 10^{-7}$ and if it is driven through a digital-to-analog converter DAC with $n=16$ bits, then the minimal control step size $\Delta f/f = z/2n = 1 \times 10^{-11}$. In one measurement cycle, therefore, the rate-of-change of the reference frequency output signal should total $2 \times 10^{-8}/1 \times 10^{-11} = 2,000$ control steps. If the control cycle of the microprocessor in the start-up mode is 1 sec., there are 20 control steps per cycle.

What I claim is:

1. A process for the resynchronization of a switching center (V2) in a telecommunication network, which is synchronized by an adjustment according to a hierarchical structure in accordance with the following steps:
   (a) a switching center is synchronized in the synchronous mode by a reference frequency of another switching center which is of the same rank and/or a superior rank;
   (b) a switching center generates the reference frequency by means of a central clock pulse generator;
   (c) a switching center is equipped with a frequency monitor that detects a loss of accuracy in a reference frequency by which it is currently being synchronized, so that after a frequency alarm is triggered;
   (c1) the switching center switches to another unaffected reference frequency, or
   (c2) the switching center changes to the free-running mode, when no other unaffected reference frequency is present;

characterized by the step that
   (f) the subsequent frequency flow of the central clock pulse generator of said switching center (V2) being caused by the resynchronization is limited in such a manner that the reference frequency that is generated by said switching center (V2) for synchronization of a network (N) that is synchronized by said switching center (V2) changes slowly enough to avoid said frequency monitors in the switching centers of the network (N) triggering frequency alarms.

* * * * *